United States Patent [19]

O'Rourke et al.

[11] 4,194,424
[45] Mar. 25, 1980

[54] APPARATUS FOR LONGITUDINAL SLICING OF CYLINDRICAL BODY

[75] Inventors: Edward C. O'Rourke, West Point; W. Wardle Fullerton, King of Prussia, both of Pa.

[73] Assignee: Merck & Co., Inc., Rahway, N.J.

[21] Appl. No.: 960,680

[22] Filed: Nov. 13, 1978

[51] Int. Cl.² ............................................. B26D 3/00
[52] U.S. Cl. ...................................... 83/870; 83/455; 83/651.1
[58] Field of Search ................................. 83/870–874, 83/455, 651.1

[56] References Cited

PUBLICATIONS

Fairbanks et al., *Biochemical and Biophysical Research Communications*, vol. 20, No. 4, 1965, pp. 393–399.
Kamm et al., *Analytical Biochemistry 53*, 1973, pp. 327–331.
Brade et al., *Analytical Biochemistry 51*, 1973, pp. 641–645.

*Primary Examiner*—J. M. Meister
*Attorney, Agent, or Firm*—Thomas E. Arther; Mario A. Monaco; Rudolph J. Anderson, Jr.

[57] ABSTRACT

This invention relates to an apparatus for slicing cylindrically shaped columns of gels. More particularly, it relates to an apparatus for firmly holding cylindrical columns of acrylamide gel while making a longitudinal slice through the entire length of the column.

2 Claims, 6 Drawing Figures

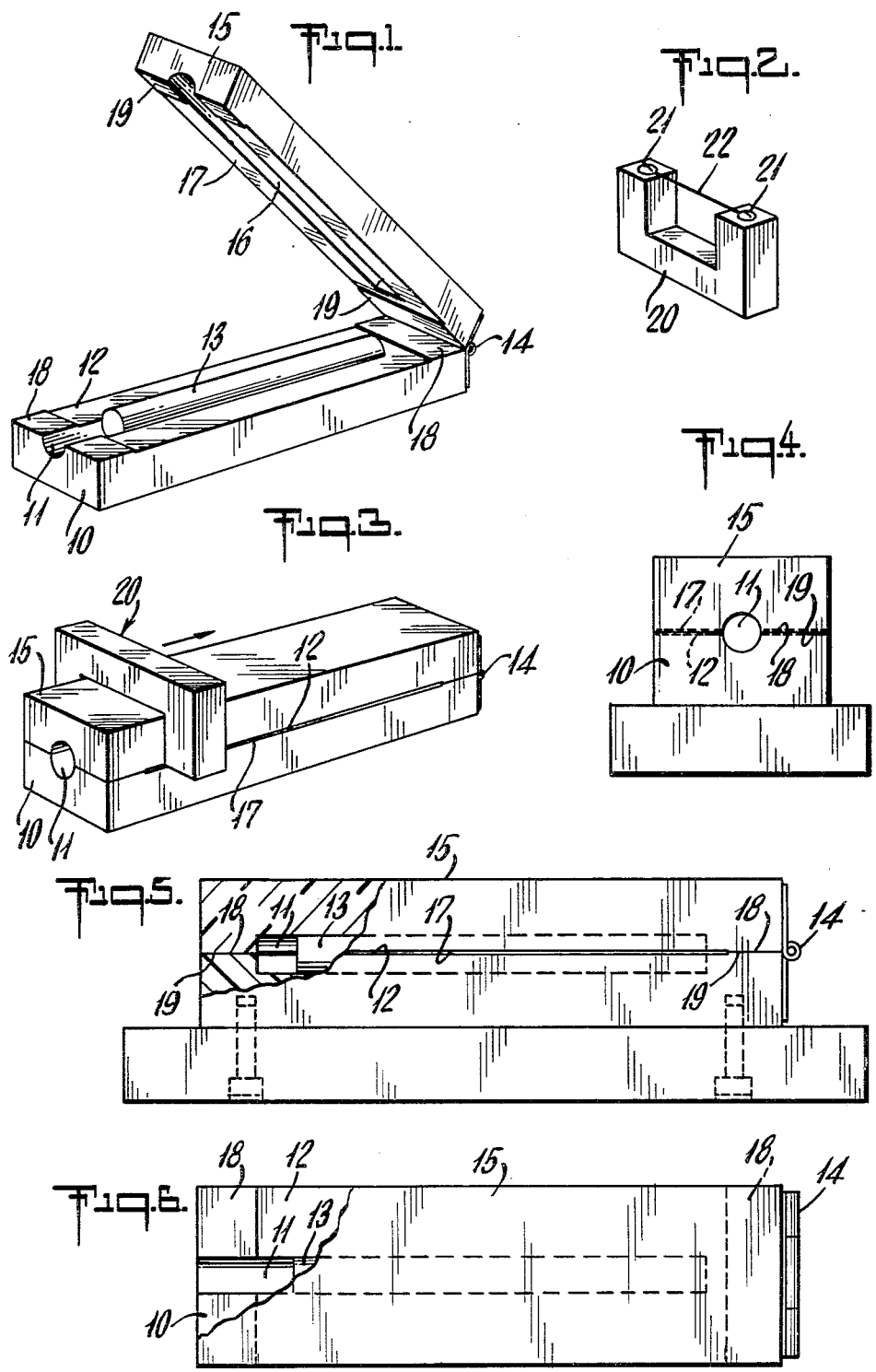

APPARATUS FOR LONGITUDINAL SLICING OF CYLINDRICAL BODY

BACKGROUND OF THE INVENTION

The present invention relates to an apparatus useful in analyzing the separated components in a cylindrical column of acrylamide gel which has been used in an electrophoresis separation process for separating components in a complex biological mixture.

Electrophoresis is the movement of charged particles in a solution or solid support medium under the influence of an electrical field. Preparative or analytical electrophoresis is carried out in a cylindrical column of a polyacrylamide gel. The solution containing the components to be analyzed or separated is applied to the top of a polymerized acrylamide gel column and a potention of measured voltage applied across the column while maintaining a continuous flow of buffer through the elution chamber. When electrophoresis is complete, the cylindrical gel containing the separated components is removed from the column and the components identified as to their position in the column and eluted from that part of the column for further purification and/or identification.

Several methods have been used to locate the position of the desired fraction on the polyacrylamide column.

In one such method, the entire polyacrylamide column with adsorbed fractions is tightly enclosed in a cylindrical gel holder and a brass jig containing three tightly stretched wires are drawn through the column to produce four longitudinal slices. One of the drawbacks of this apparatus is that it is difficult to fabricate so that the slices will be prepared without distorting the shape of the slice. This apparatus requires extreme care in processing slices after preparation and is rather expensive to manufacture, requiring very close tolerances and also making it difficult for the operator to cut slices without distorting the column.

Other methods involve the preparation of specially fitted jigs to hold the cylindrical acrylamide gel column in position and carefully positioned blades to cut longitudinal slices from the column. All except the crudest of these prior art devices were expensive and or difficult to manufacture, or were difficult to operate without distorting the shape of the cylindrical gel column.

DESCRIPTION OF THE INVENTION

One of the objects of the present invention is the provision of an apparatus for slicing longitudinal sections of cylindrically shaped columns of gels which is easy to manufacture and simple to operate.

One feature of this invention is the provision of two transparent blocks, each having a matching depression shaped to hold a cylindrical object in a fixed position. The blocks are hinged at one end to facilitate easy insertion and removal of the cylindrical object and the longitudinal sections thereof. One of these blocks is firmly fastened to a base plate and the other or top block acts as a cover for the cylindrical object to be sliced.

Another feature of this invention is the provision of a slicing device in the form of a very thin wire stretched between the ends of a U-shaped member. A further feature of the present invention is that the U-shaped member is designed to fit closely over the top block and allow the tightly stretched wire to be drawn through the cylindrical shaped gel; thus slicing it into two longitudinal sections.

Further features and advantages will be readily apparent from the following specifications and the drawings in which:

FIG. 1 is a view of the holding blocks in open position for receiving the cylindrical column of gel, FIG. 2 is a side view of the slicing device used to slice the gel column longitudinally, FIG. 3 is an overall view of the holding blocks in closed position with the slicing device in operating position, FIG. 4 is an end elevation of the cutting blocks in closed position illustrating the cylindrical depression for the gel column, FIG. 5 is a side elevation of the holding blocks illustrating the narrow slit at interface of the block to allow passage of the cutting wire through the gel column, and FIG. 6 is a top view of the holding blocks in closed position with dotted lines showing the relative position of the cylindrical depression and the extent of the narrow slit at the interface of the holding blocks.

Turning to the drawings, and particularly to FIG. 1, there is provided a pair of transparent blocks (10 and 15) fastened at one end by a hinge (14) so that the opposing faces (18 and 19) of the blocks may be brought together. Each of said faces is provided with flat recessed portions (13 and 16) so that a fine wire may be passed between said blocks. There is also provided at the open end of faces 18 and 19, matching depressions 11 and 16 extending longitudinally toward the hinge (14) end of said faces; the depressions 11 and 16 being in the shape of cylinders sliced in half along the longitudinal axis.

In FIG. 2, there is shown the device used for slicing the acrylamide columns longitudinally. A U-shaped metal frame is provided with metal screws (21) threaded into the terminal cross-section area of the U-shaped metal frame. These screws provide a means to stretch a thin wire (22) across the ends of the U-shaped frame.

In FIG. 3, there is shown an operating view of the slicing apparatus in closed position. In this view, the column is in place and the slicing device (20) is in slicing position with the wire (22) extending through the closed blocks (10 and 15) at one end of the recessed opposing faces 12 and 17, thus passing through gap 22. In operation, the slicing device is moved from the open end of the blocks to the hinged end (14), through gap 20, thus slicing the cylindrical column of gel along its longitudinal axis. One of the gel column halves can then be treated by staining in one way to identify the components present in the column. The other half can be treated in a different manner using a different stain or monitored for radioactivity if a radioactive isotope is present in the material undergoing electrophoresis.

From the above, it will be seen that novel and advantageous provisions have been made for carrying out the desired end. However, it should be noted that additional variations in this invention may be made without departing from the scope thereof as defined in the appended claims.

What is claimed is:

1. A device for slicing cylindrical columns of gels comprising a base and two transparent rectangular-shaped blocks and a U-shaped frame having a thin wire stretched across the terminal ends of the U-shaped frame; said blocks provided at one end with a hinge so that opposing faces of said blocks may be brought together; each of said blocks being provided with a depression in the face which matches the face in the other block, and when brought together, provides a cylindrical shaped recess adapted for firmly holding a cylindrical column of acrylamide gel; said blocks having said oppossing faces provided with recessed faces adjacent the cylindrical depression, whereby a thin wire may be passed longitudinally between said blocks to slice a gel column held therebetween.

2. A device as defined in claim 1 in which the U-shaped member is sized to fit closely over the outside of one of said blocks, thereby providing a stable guide for the thin wire for slicing said column.

* * * * *